United States Patent

Kishi

[11] Patent Number: 5,949,075
[45] Date of Patent: Sep. 7, 1999

[54] RADIATION DOSIMETER

[75] Inventor: Toshiyuki Kishi, Tokorozawa, Japan

[73] Assignee: Citizen Watch Co., Ltd., Tokyo, Japan

[21] Appl. No.: 08/917,705

[22] Filed: Aug. 26, 1997

[51] Int. Cl.[6] ............................ G01T 1/24; H01C 31/115; G11C 11/40; H01L 29/792

[52] U.S. Cl. .................................. 250/370.07; 250/370.05

[58] Field of Search ......................... 250/370.07, 370.05

[56] References Cited

U.S. PATENT DOCUMENTS

| 4,431,920 | 2/1984 | Srour et al. | 250/370 |
| 5,589,699 | 12/1996 | Araki | 257/316 |

OTHER PUBLICATIONS

IEEE Transactions of Nuclear Science, vol. 42, No. 2, Apr. 1995.

*Primary Examiner*—Constantine Hannaher
*Assistant Examiner*—Andrew Israel
*Attorney, Agent, or Firm*—Armstrong, Westerman, Hattori, McLeland & Naughton

[57] ABSTRACT

A radiation dosimeter including a series circuit of an MONOS semiconductor and a resistor or an MOS or MONOS semiconductor device whose channel conductivity type is opposite from that of the first said MONOS semiconductor device. The MONOS semiconductor device is an electrically rewritable non-volatile memory cell having a gate insulating film consisting of a tunnel oxide film, a silicon nitride film and a top oxide film. The resistor is made of polycrystalline silicon which is little affected by exposure to radiation. The series circuit is connected between a source voltage and ground (GND) and a detection signal is obtained from the connection point between the members of the series circuits.

16 Claims, 12 Drawing Sheets

RADIATION DOSIMETER

BACKGROUND OF THE INVENTION

1. Field of the Invention

This invention relates to a radiation dosimeter for measuring radiation dose a place where radiation exposure is likely to occur, such as in space or at a nuclear reactor site and, more particularly, to an apparatus that measures radiation dose using a semiconductor device and can be reconditioned for repeated use by electrically removing electric charge building up therein owing to exposure to radiation.

2. Description of the Related Art

When an MOS semiconductor device is used under exposure to radiation, such as in space or at a nuclear reactor site, its operation becomes defective when the total radiation dose received reaches around $1 \times 10^6$ RAD.

Figure 19:
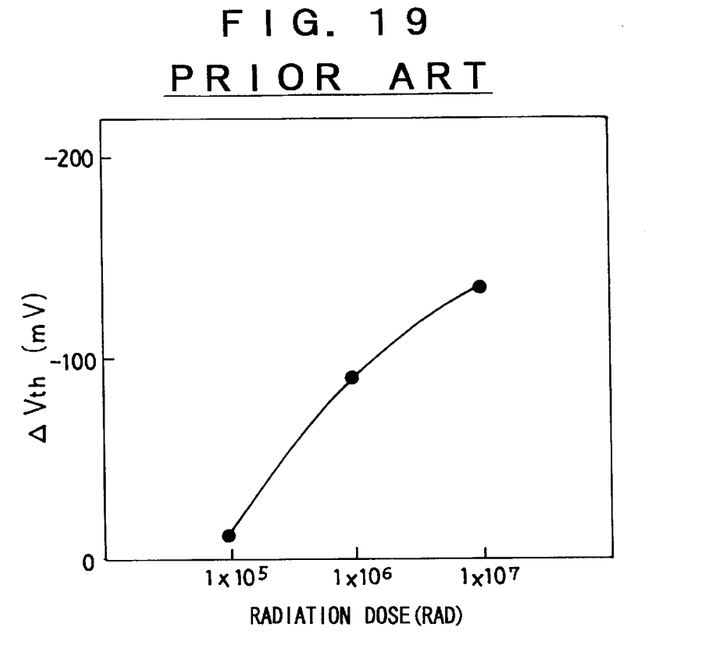
FIG. 19 is a characteristic curve showing the threshold voltage of an N-channel MOS semiconductor device changes with radiation dose.
Figure 20:
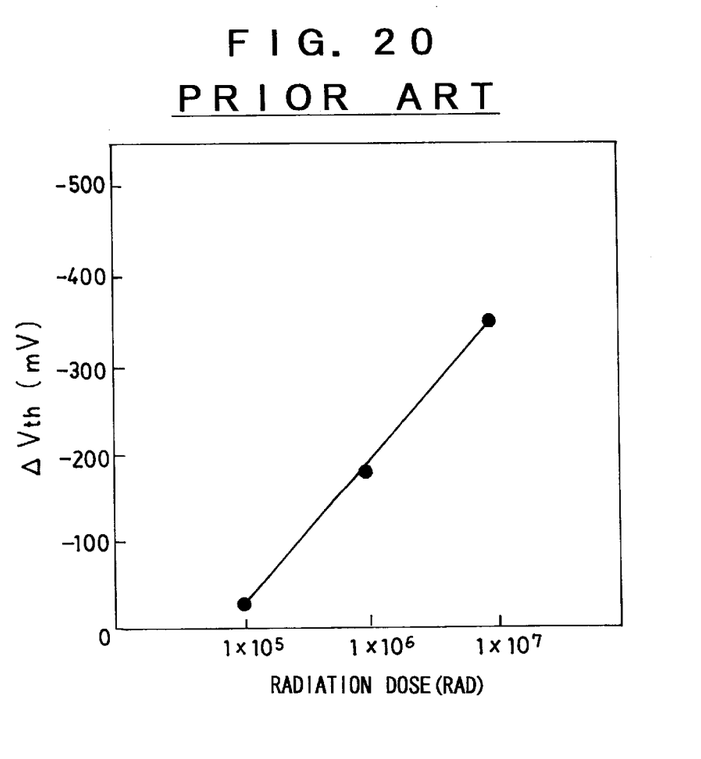
FIG. 20 is a characteristic curve showing how the threshold voltage of a P-channel MOS semiconductor device changes with radiation dose.

FIGS. 19 and 20 are graphs for explaining why the operation of the MOS semiconductor device becomes defective under exposure to radiation.

The characteristic curve of FIG. 19 shows how the threshold voltage of an N-channel MOS semiconductor device changes with radiation dose. The horizontal axis represents radiation (gamma-ray) dose and the vertical axis the amount of change in threshold voltage ($\Delta Vth$) caused by the radiation.

As shown in FIG. 19, the threshold voltage of the N-channel MOS semiconductor device decreases with increasing dose. The leakage current of the N-channel MOS semiconductor device therefore increases.

The characteristic curve of FIG. 20 shows how the threshold voltage of a P-channel MOS semiconductor device changes with radiation dose. The horizontal axis represents radiation (gamma-ray) dose and the vertical axis the amount of change in threshold voltage ($\Delta Vth$) caused by the radiation.

As shown in FIG. 20, the threshold voltage (absolute value) of the P-channel MOS semiconductor device increases with increasing dose. The P-channel MOS semiconductor device therefore turns off and becomes inoperative.

An MOS semiconductor device of either the N-channel or P-channel type used under exposure to radiation thus experiences a progressive change in threshold voltage with increasing radiation dose.

Since the threshold voltage shift is in the negative direction, it follows that the charge produced by radiation exposure is positive. The occurrence of this positive charge in the gate oxide film has been observed.

A system incorporating MOS semiconductor devices and used under exposure to radiation will therefore become inoperative as the radiation dose increases.

MOS semiconductor devices made inoperable by radiation exposure are ordinarily reconditioned by annealing at a temperature between 300° C. and 400° C. to remove the positive charge accumulated in the gate oxide film.

Since complete removal of positive charge by annealing is difficult, however, the total radiation dose a system can tolerate is limited. System replacement is therefore necessary after a certain period of use.

Another problem is that the system is undesirably enlarged by the need to incorporate a device for effecting the annealing. As the conventional system provides no information regarding the radiation dose, moreover, accurate prediction of when operation failure will occur is impossible. Since the only alternative is to conduct annealing at regular time intervals, the efficiency of positive charge removal cannot be optimized when the system is used in an environment where the radiation dose varies continually.

The MOS semiconductor device is also used as a dosimeter which measures radiation dose based on the radiation damage it incurs. Although this type of dosimeter has the merits of small size, wide dose measurement range and low cost, its sensitivity is insufficient for use in very low radiation dose regions and its reproducibility poor.

Another dosimeter employed measures radiation dose by using a combination of an operational amplifier and a capacitor as a charge amplifier to integrate ionization current from a silicon diode or a solar cell used as a solid-state ionization chamber.

This dosimeter has the drawback of being enlarged by the size of its complex integrator circuit. Further, since the characteristic of its operational amplifier would be degraded by radiation damage if installed at a high-intensity radiation site, the integrator has to be separately placed in a safe area and supplied with the ionization current through a cable.

This invention was accomplished in response to these circumstances and is directed to providing a compact and simple radiation dosimeter which utilizes the aforesaid change in the threshold voltage of a semiconductor device with radiation exposure to accurately measure radiation dose at a place exposed to radiation, such as in space or at a nuclear reactor site, and which can be reconditioned for repeated use by electrically removing electric charge building up therein owing to exposure to radiation.

SUMMARY OF THE INVENTION

In order to achieve this object, the invention provides a radiation dosimeter comprising an MONOS semiconductor device and a resistor connected in series between a source voltage and ground (GND), the MONOS semiconductor device being an electrically rewritable non-volatile memory cell having a gate insulating film consisting of a tunnel oxide film, a silicon nitride film and a top oxide film, and a detection signal being obtainable from a connection point between the MONOS semiconductor device and the resistor.

The resistor is preferably constituted of polycrystalline silicon whose resistance value is little changed by exposure to radiation.

The resistor can be replaced by an MOS semiconductor device or an MONOS semiconductor device whose channel conductivity type (N-channel type or P-channel type) is opposite from that of the aforesaid MONOS semiconductor device.

The radiation dosimeter can be further provided with a pulse generator and a NAND circuit. In this configuration, the NAND circuit is input with the pulse signal generated by the pulse generator and the aforesaid detection signal and outputs a pulse detection signal from its output terminal.

The radiation dosimeter can be further provided with an inverter which inverts and outputs the detection signal.

The radiation dosimeter can be provided with a control circuit including a power circuit for supplying the source voltage, a circuit for effecting rewrite of the MONOS semiconductor device and a circuit for detecting change in the detection signal and with a shielding wall for shielding the control circuit from radiation.

The control circuit can be provided with an arithmetic circuit which calculates the radiation dose from the detection signal, causes the circuit for effecting rewrite of the MONOS semiconductor device to effect rewrite of the MONOS semiconductor device when the calculated dose becomes greater than a preset value and calculates the total radiation dose from the number of rewrites.

The radiation dosimeter according to the invention thus outputs a detection signal obtained by dividing the power source voltage by a series circuit consisting of an MONOS semiconductor device (an electrically rewritable non-volatile memory cell) and a resistor or consisting of an MONOS semiconductor device and an MOS semiconductor device or MONOS semiconductor device of opposite channel conductivity type. Since the conducting resistance between the source and drain of the MONOS semiconductor device varies in proportion to the radiation dose and the divided voltage (detection signal) varies with the change in this resistance, the detection signal represents the radiation dose.

Since the positive charge produced in the gate insulating film of the MONOS semiconductor device by the radiation can be removed by effecting an electrical rewrite operation (by applying positive voltage to the gate in the case of an N-channel MONOS semiconductor device), the radiation dosimeter can be reconditioned for repeated use. In addition, the total radiation dose can be calculated from the counted number rewrites.

When the radiation dosimeter is used together with other semiconductor equipment at a place exposed to radiation, such as in space or at a nuclear reactor site, the data it provides can be used for accurately estimating when the other semiconductor equipment will become inoperative owing to radiation exposure or when it will require annealing of its semiconductor devices. Faulty operation of semiconductor systems can therefore be avoided by replacing them at the optimum time and/or by effecting annealing to remove accumulated positive charge.

The above and other objects, features and advantages of the invention will be apparent from the following detailed description which is to be read in conjunction with the accompanying drawings.

DETAILED DESCRIPTION OF THE PREFERRED EMBODIMENTS

Embodiments of the invention will now be explained with reference to the drawings.

First Embodiment: FIGS. 1 to 4

Figure 1:
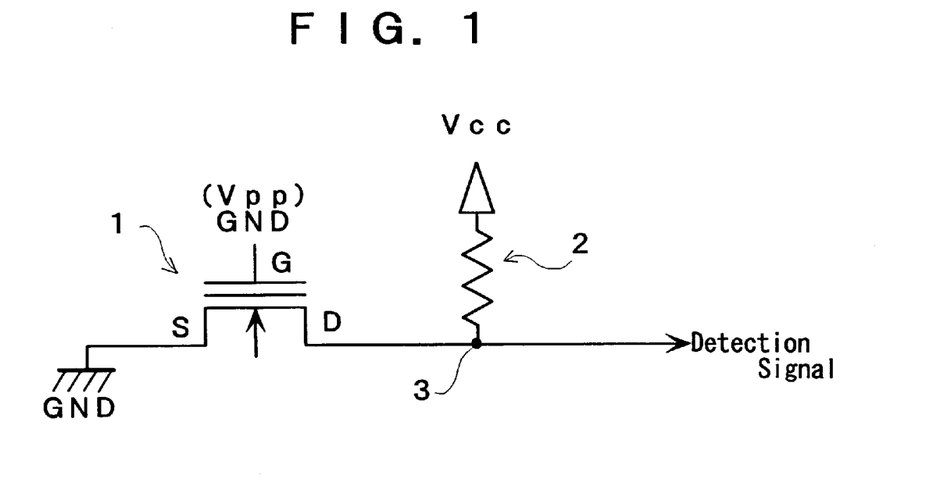
FIG. 1 is a circuit diagram showing the configuration of a radiation dosimeter that is a first embodiment of the invention.

The basic configuration of the radiation dosimeter according to the invention is shown as a first embodiment in FIG. 1.

This radiation dosimeter comprises an MONOS semiconductor device 1 (an electrically rewritable non-volatile memory cell) and a resistor 2 connected in series between a source voltage Vcc and ground (GND), and a detection signal is obtained from a connection point 3 between the MONOS semiconductor device 1 and the resistor 2.

In this embodiment, the MONOS semiconductor device 1 is an N-channel MONOS semiconductor device whose source (S) is connected to ground (is at ground potential) and whose drain (D) is connected to the positive source voltage Vcc through the resistor 2. The gate (G) of the MONOS semiconductor device 1 is normally maintained at ground potential by connection to ground (GND) and is applied with a rewrite voltage Vpp only at initialization. The resistor 2 is made of polycrystalline silicon, a material whose resistance value is little changed by exposure to radiation.

The structure and characteristics of the N-channel MONOS semiconductor device 1 used in this embodiment will now be explained with reference to FIGS. 2 to 4.

Figure 2:
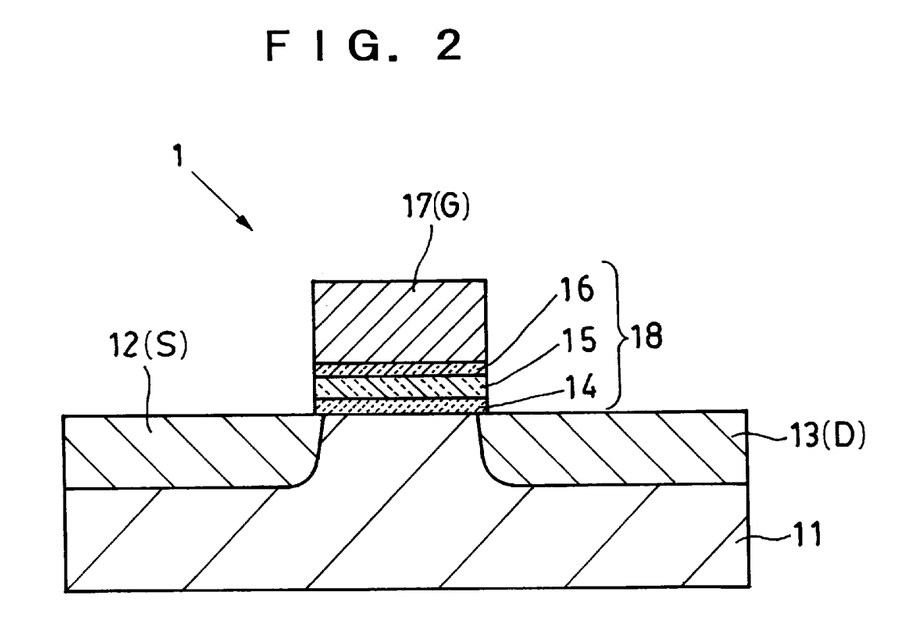
FIG. 2 is an enlarged sectional view showing the structure of the N-channel MONOS semiconductor device 1 in FIG. 1.

FIG. 2 is an enlarged sectional view showing the structure of the N-channel MONOS semiconductor device.

The N-channel MONOS semiconductor device 1 has a P-type semiconductor substrate 11 on which is provided an ONO (Oxide-Nitride-Oxide) gate insulating film 18 constituted of a 2.4 nm-thick tunnel oxide film 14, a 9.0 nm-thick silicon nitride film 15 formed on the tunnel oxide film 14 and a 4.0 nm-thick top oxide film 16 formed on the silicon nitride film 15. A gate electrode (hereinafter called simply "gate") 17 is formed on the gate insulating film 18.

A source 12 and a drain 13 consisting of high-concentration N-type impurity layers are formed on the P-type semiconductor substrate 11 in alignment with the opposite sides of the gate 17.

The transistor operation of this N-channel MONOS semiconductor device 1 can be shifted to enhanced operation by applying the positive voltage Vpp to the gate 17 so as to inject electrons into the gate insulating film 18 of ONO film structure from the P-type semiconductor substrate 11.

On the other hand, the transistor operation can be shifted to depressed operation by applying negative voltage to the gate 17 so as to inject holes into the gate insulating film 18 of ONO film structure from the P-type semiconductor substrate 11.

The N-channel MONOS semiconductor device 1 can therefore be used as an electrically rewritable non-volatile memory cell.

The change in the threshold voltage (Vth) of the N-channel MONOS semiconductor device when it is exposed to radiation will now be explained with reference to FIG. 3.

Figure 3:
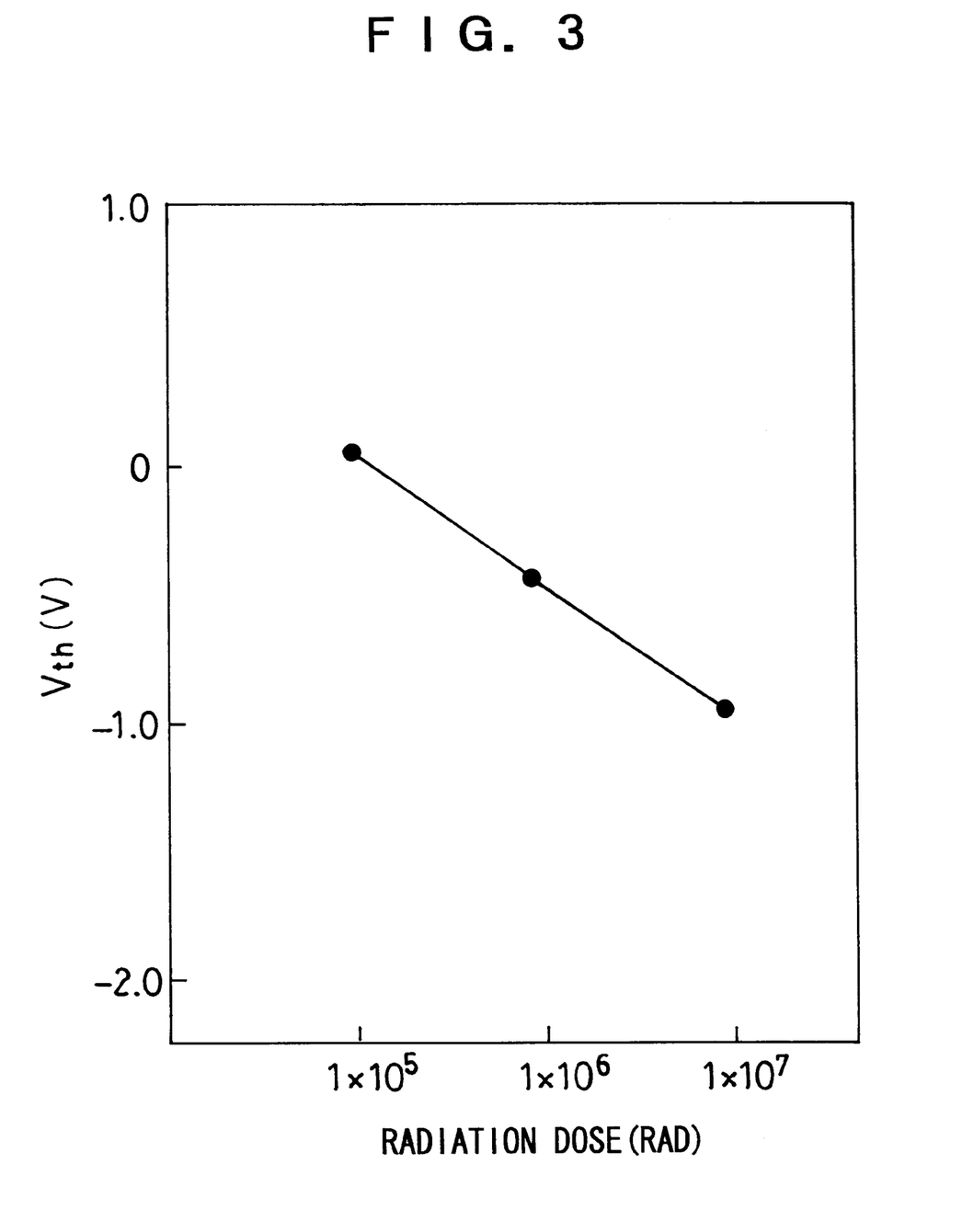
FIG. 3 is a graph showing change in the threshold voltage (Vth) of the N-channel MONOS semicondutor or device with exposure to radiation.

The horizontal axis in the graph of FIG. 3 is scaled for dose (RAD) of gamma-rays from cobalt-60 and the vertical axis is scaled for the threshold voltage Vth (V) of the N-channel MONOS semiconductor device.

As shown in FIG. 3, the threshold voltage of the N-channel MONOS semiconductor device varies almost linearly with the radiation dose. The threshold voltage Vth (V) can be expressed as a function of radiation dose by the empirical equation:

$$Vth = -0.485 \cdot \log(T\alpha) + 2.445 \quad (1)$$

Tα: Radiation dose (RAD).

If the circuit is configured to have the MONOS semiconductor device threshold voltage defined by Equation (1) as its sense level, the radiation dose when the threshold voltage reaches this level can be calculated from Equation (1), meaning that the MONOS semiconductor device can be used as a radiation dose detector.

Specifically, when the MONOS semiconductor device 1 of FIG. 1 is exposed to radiation, its threshold voltage Vth falls with increasing radiation dose as shown in FIG. 3. This causes the conducting resistance between the source (S) and the drain (D) to fall and the drain current to rise, notwithstanding that the gate (G) is maintained at ground potential. The potential of the detection signal appearing at the connection point 3 between the MONOS semiconductor device and the resistor 2 therefore falls. This enables detection of the radiation dose.

The threshold voltage of the MONOS semiconductor device changed by radiation exposure can be electrically restored to its initial state. This will be explained with reference to the characteristic curves of FIG. 4.

Figure 4:
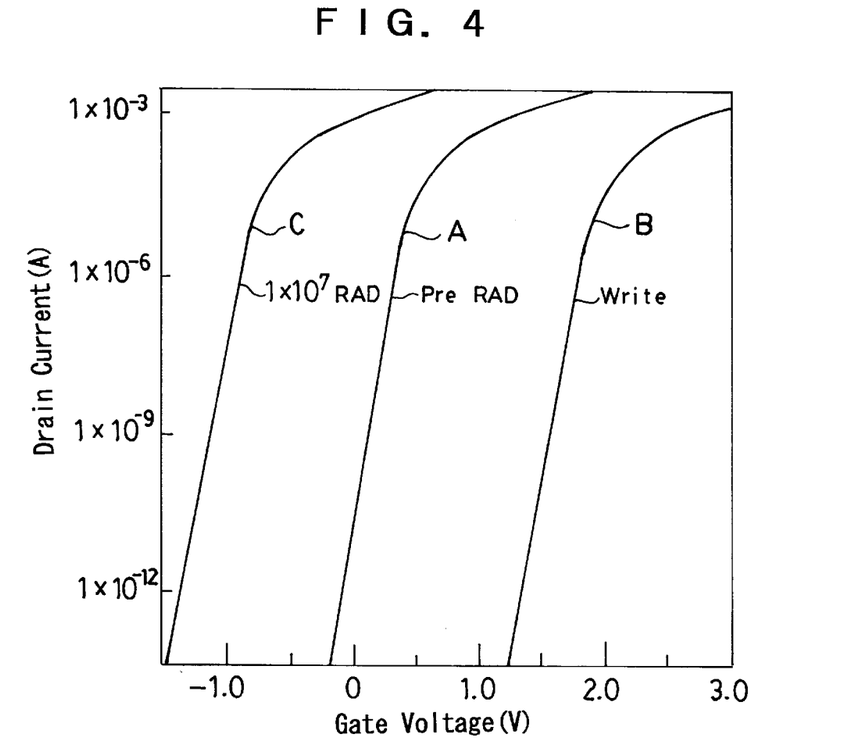
FIG. 4 is a graph showing correlation between gate voltage and drain current at different stages in the use of the same N-channel MONOS semiconductor device.

FIG. 4 is a graph showing the correlation between gate voltage and drain current at different stages in the use of the N-channel MONOS semiconductor device. The gate voltage applied to the gate 17 is represented on the horizontal axis and the drain current on the vertical axis.

Curve A represents the initial characteristic of the N-channel MONOS semiconductor device at the time of fabrication, curve B the initial characteristic following initialization for detection, and curve C the characteristic after exposure to a radiation dose of $1 \times 10^7$ RAD.

Similarly to the characteristics of the MOS semiconductor devices explained earlier with reference to FIGS. 19 and 20, the characteristic of the N-channel MONOS semiconductor device also shifts in the negative direction as the holes of the electron-hole pairs produced by the radiation are caught by the gate insulating film 18 and accumulate therein as positive charge. The characteristic at a radiation dose of $1 \times 10^7$ RAD is shown by curve C.

When the gate 17 of the N-channel MONOS semiconductor device whose characteristic has reached this limit of usability is applied with a positive 9 V pulse of 20 ms width, the N-channel MONOS semiconductor device is restored to the characteristic of curve B. This is because the application of the positive voltage to the gate 17 shown in FIG. 2 ejects the holes caught in the gate insulating film 18 owing to radiation exposure into the P-type semiconductor substrate 11 and injects electrons from the P-type semiconductor substrate 11 into the gate insulating film 18.

Since the curve B represents the initial characteristic mentioned earlier, this restoration means that the positive charge captured by the gate insulating film 18 owing to radiation exposure can be electrically removed.

The N-channel MONOS semiconductor device can therefore be maintained in normal operation even in a radiation environment by effecting electrical rewrite (initialization) thereon. Electrical rewriting of the N-channel MONOS semiconductor device thus enables it to be repeatedly reconditioned and reused as a radiation dosimeter.

The first embodiment shown in FIG. 1 will now be explained further using specific numerical values.

The N-channel MONOS semiconductor device 1 used in the radiation dosimeter shown in FIG. 1 has, for example, a channel width of 10 $\mu$m and a channel length of 2 $\mu$m and the resistance value of the polycrystalline silicon resistor 2 is, for instance, 150 K$\Omega$.

Under these conditions, the detection signal appearing at the connection point 3 between the N-channel MONOS semiconductor device 1 and the resistor 2 is initially at the level of the positive source voltage Vcc. When the threshold voltage Vth of the N-channel MONOS semiconductor device 1 falls to around $-0.5$ V with increasing radiation dose, however, the detection signal falls to ground (GND) potential level (0 V).

The radiation dose when the threshold voltage of the N-channel MONOS semiconductor device 1 reaches $-0.5$ V is found from Equation (1) to be $1 \times 10^6$ RAD. The fact that the detection signal appearing at the connection point 3 has fallen to ground potential level therefore indicates that the radiation dose has reached $1 \times 10^6$ RAD.

When the detection signal has fallen to ground potential, if the gate G of the N-channel MONOS semiconductor device 1 is applied with a 1 ms-wide pulse of the 9 V rewrite voltage (Vpp), the threshold voltage is restored to its initial value. When the gate G is thereafter returned to ground potential, the threshold voltage of the N-channel MONOS semiconductor device 1 again varies with radiation dose in the manner of Equation (1).

If the foregoing operation is repeated and the number of rewrites effected for initializing the gate 17 of the MONOS semiconductor device 1 are counted, the radiation doses can be summed to obtain the total radiation dose.

Since the radiation dosimeter of this embodiment is configured by connecting the N-channel MONOS semiconductor device 1 and the resistor 2 in series between the source voltage and ground, the detected threshold voltage Vth of the N-channel MONOS semiconductor device 1 can be changed by changing the resistance value of the resistor 2. As this also changes the radiation dose at which the detection signal reaches ground potential, detection of a desired radiation dose is possible by selecting the resistance value of the resistor 2.

Figure 5:
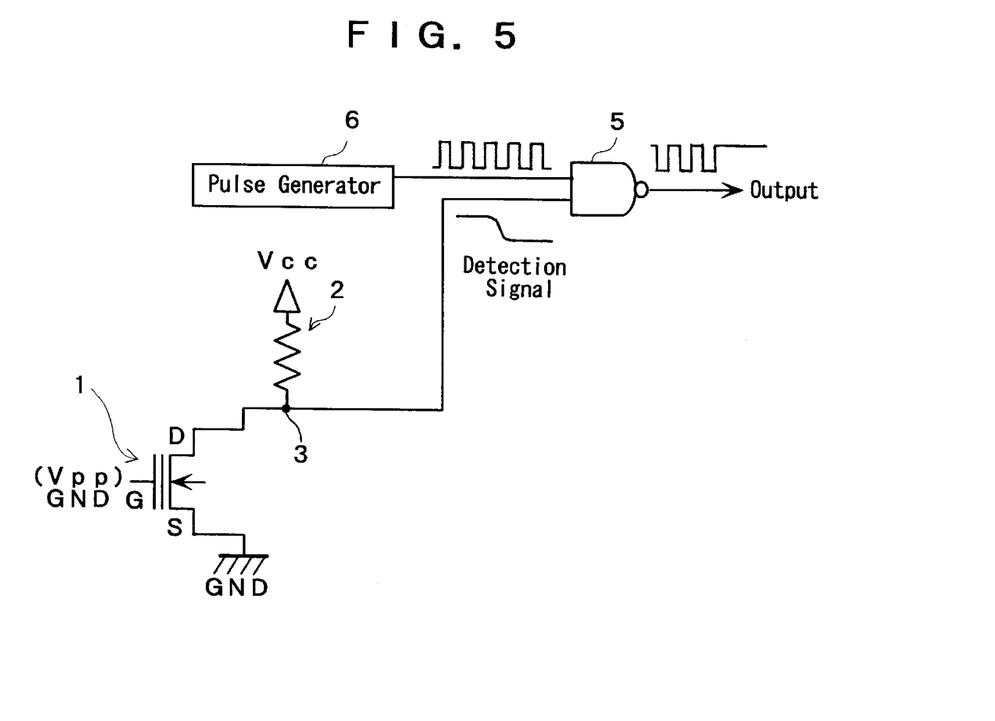
FIGS. 5 to 18 are circuit diagrams showing the configurations of radiation dosimeters that are second to fifteenth embodiments of the invention.

Second Embodiment: FIG. 5

Other embodiments of the invention radiation dosimeter will now be explained with reference to FIGS. 5 to 18. Portions in these figures like those in FIG. 1 are assigned like reference symbols to those in FIG. 1 and explanation that would be the same as that already given with respect to the first embodiment is omitted.

The second embodiment shown in FIG. 5 is what is obtained by adding a pulse generator 6 and a NAND circuit 5 to the circuit of the first embodiment shown in FIG. 1. The detection signal from the connection point 3 between the N-channel MONOS semiconductor device 1 and the resistor 2 and the pulse signal produced by the pulse generator 6 are input to the NAND circuit 5. The detection output is obtained from the output terminal of the NAND circuit 5.

Since the source voltage Vcc keeps the detection signal from the connection point 3 at positive voltage level until the radiation dose reaches a prescribed value, e.g., $1 \times 10^6$ RAD as in the first embodiment, the output of the NAND circuit 5, which is the detection output in this second embodiment, is normally the signal obtained by inverting the pulse signal produced by the pulse generator 6.

When the radiation dose reaches $1 \times 10^6$ RAD, however, the detection signal from the connection point 3 falls to ground potential level. Since one of the inputs to the NAND circuit 5 therefore becomes low level, the output of the NAND circuit 5 remains constantly at high level (Vcc) irrespective of the pulse signal input from the pulse generator 6.

The fact that the radiation dose has reached $1 \times 10^6$ RAD can therefore be learned by monitoring this output and noting when the pulse signal ceases to be output.

Although the signal from the connection point 3 is not a distinct binary signal but has a certain transient region, the NAND circuit 5 has an input discrimination threshold value and can treat the signal as if it were a binary signal.

Figure 6:
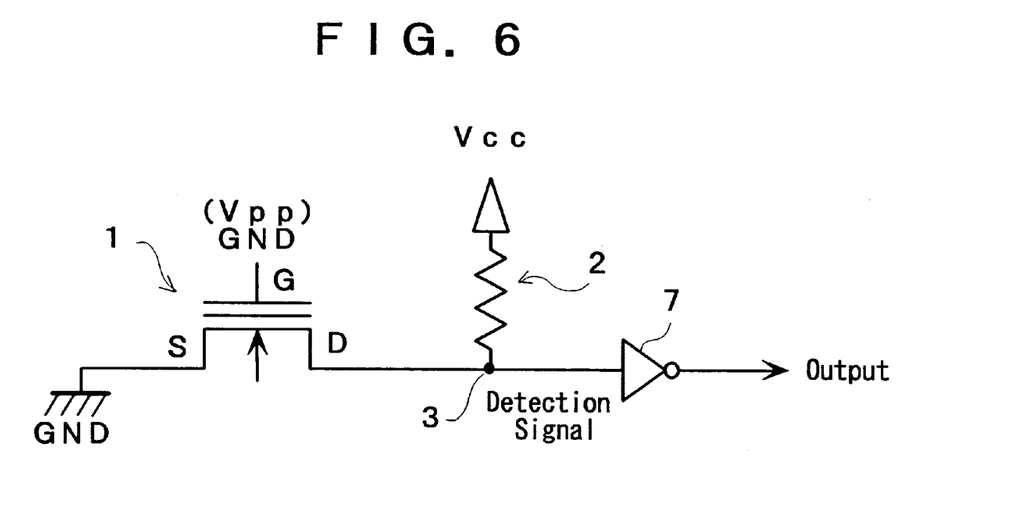

Third Embodiment: FIG. 6

The third embodiment shown in FIG. 6 is what is obtained by providing the circuit of the first embodiment shown in FIG. 1 with an inverter 7 for inverting and outputting the detection signal from the connection point 3 between the N-channel MONOS semiconductor device 1 and the resistor 2.

Since source voltage Vcc keeps the detection signal from the connection point 3 at positive voltage level until the radiation dose reaches a prescribed value, e.g., $1 \times 10^6$ RAD as in the first embodiment, the output of the inverter 7, which is the detection output in this third embodiment, is ordinarily a normalized low-level (ground potential) signal obtained by inverting the detection signal.

When the radiation dose reaches $1 \times 10^6$ RAD, however, the detection signal input to the inverter 7 falls to ground potential level. The output of the inverter 7 therefore becomes high level (Vcc level). From this it can be ascertained that the dose has reached $1 \times 10^6$ RAD.

Since the inverter 7 of the third embodiment thus outputs the detection signal as a normalized and amplified binary signal, the radiation dosimeter can reliably detect a preset radiation dose.

Figure 7:
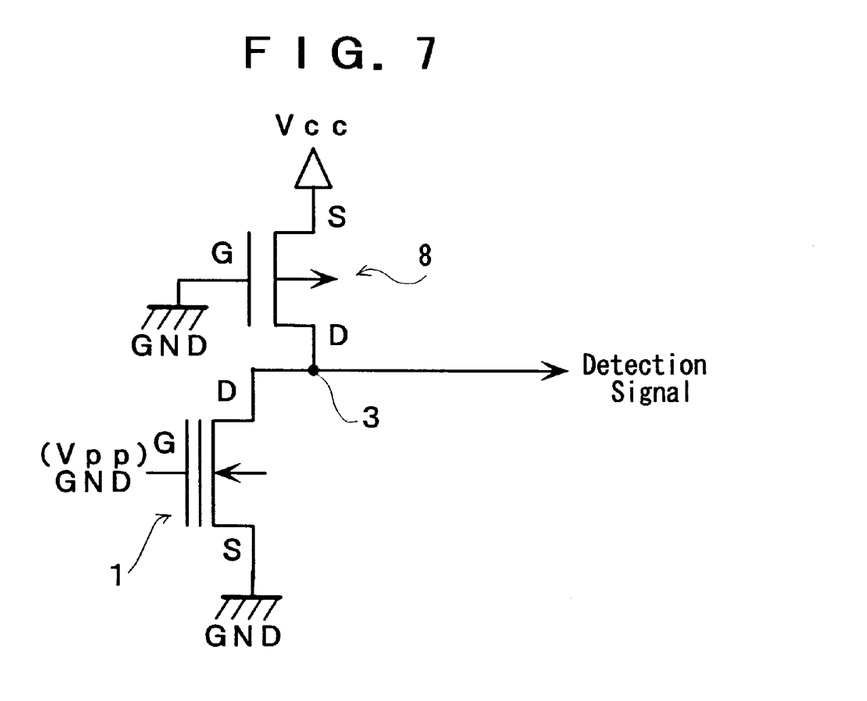

Fourth Embodiment: FIG. 7

An embodiment which uses an MOS semiconductor device in place of the resistor 2 in the preceding embodiments will now be explained.

The fourth embodiment shown in FIG. 7 is a radiation dosimeter configured by using a P-channel MOS semiconductor device 8 in place of the resistor 2 of the first embodiment shown in FIG. 1.

In line with this, the drains (D) of the N-channel MONOS semiconductor device 1 and the P-channel MOS semiconductor device 8 are connected together at the connection point 3, the source (S) of the N-channel MONOS semiconductor device 1 is connected to ground (GND) to put it at ground potential, and the source (S) of the P-channel MOS semiconductor device 8 is connected to the source voltage Vcc. The gate (G) of the MONOS semiconductor device 1 is normally maintained at ground potential by connection to ground (GND) and is applied with the rewrite voltage Vpp only at initialization. The gate (G) of the P-channel MOS semiconductor device 8 is always kept connected to ground (GND) to keep it at ground potential.

The P-channel MOS semiconductor device 8 is fabricated to have a channel width of 6 $\mu$m, a channel length of 18 $\mu$m, and a conducting resistance of 150 K$\Omega$.

In this fourth embodiment, the threshold voltage of the N-channel MONOS semiconductor device 1 is initially high and the conducting resistance between its source and drain extremely high. The positive source voltage Vcc therefore produces the detection signal through the 150 K$\Omega$ conducting resistance between the source and drain of the P-channel MOS semiconductor device 8.

When the N-channel MONOS semiconductor device 1 is exposed to radiation, however, its threshold voltage falls and its conducting resistance decreases. As shown in FIG. 20, moreover, the absolute value of threshold voltage of the P-channel MOS semiconductor device 8 is increased by the radiation exposure. As a result, its conducting resistance also increases, to around 200 K$\Omega$, with increasing radiation dose.

When the radiation dose reaches $5 \times 10^5$ RAD, the detection signal from the connection point 3 between the N-channel MONOS semiconductor device 1 and the P-channel MOS semiconductor device 8 reaches ground potential level. From this it can be ascertained that the dose has reached $5 \times 10^5$ RAD.

The fourth embodiment can thus detect radiation dose with higher sensitivity than the earlier described embodiments.

Figure 8:
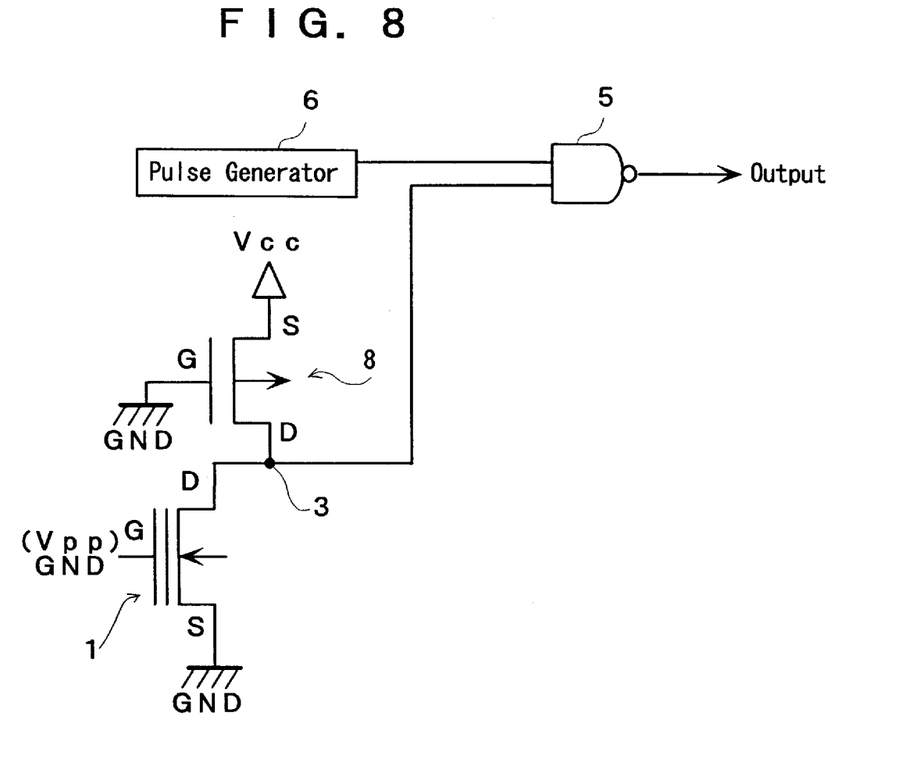

Fifth Embodiment: FIG. 8

The fifth embodiment shown in FIG. 8 is what is obtained by adding a pulse generator 6 and a NAND circuit to the circuit of the fourth embodiment shown in FIG. 7, and in this respect is similar to the second embodiment shown in FIG. 5. The detection signal from the connection point 3 between drains of the N-channel MONOS semiconductor device 1 and the P-channel MOS semiconductor device 8 and the pulse signal produced by the pulse generator 6 are input to the NAND circuit 5. The detection output is obtained from the output terminal of the NAND circuit 5.

In this fifth embodiment, as in the fourth embodiment, the P-channel MOS semiconductor device 8 is fabricated to have a channel width of 6 $\mu$m, a channel length of 18 $\mu$m, and a conducting resistance of 150 K$\Omega$.

In this embodiment, as in the earlier second embodiment, the NAND circuit 5 ceases output of the pulse signal and maintains a constant high-level output when the radiation dose reaches a certain level. However, the output of the pulse signal stops at a lower radiation dose than in the second embodiment, namely, at $5 \times 10^5$ RAD. From this it can be ascertained that the dose has reached $5 \times 10^5$ RAD.

Figure 9:
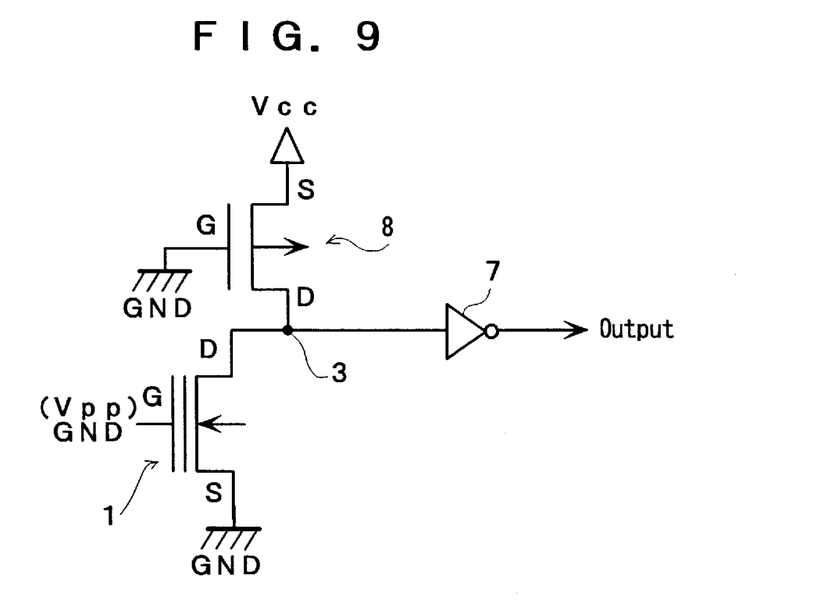

Sixth Embodiment: FIG. 9

The sixth embodiment shown in FIG. 9 is what is obtained by providing the circuit of the fourth embodiment shown in FIG. 7 with an inverter 7 for inverting and outputting the detection signal from the connection point 3 between the drains of the N-channel MONOS semiconductor device 1 and the P-channel MOS semiconductor device 8.

The output of the inverter 7 of this sixth embodiment changes in the same manner as in the fourth embodiment but is at low level until the radiation dose reaches $5 \times 10^5$ RAD. Then, when the radiation dose reaches $5 \times 10^5$ RAD, the detection signal from the connection point 3 falls to ground potential level (low level), whereby the output of the inverter 7 becomes high level. From this it can be ascertained that the dose has reached $5 \times 10^5$ RAD.

Figure 10:
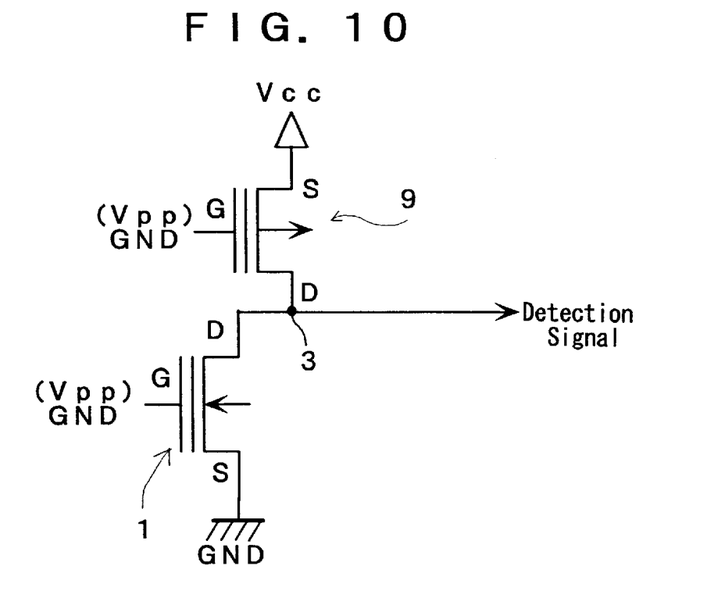

Seventh Embodiment: FIG. 10

An embodiment which uses a P-channel MONOS semiconductor device 9 in place of the P-channel MOS semiconductor device in the fourth to sixth embodiments will now be explained.

The seventh embodiment shown in FIG. 10 is a radiation dosimeter configured by using a P-channel MONOS semiconductor device 9 in place of the P-channel MOS semiconductor device 8 of the fourth embodiment shown in FIG. 7.

In line with this, as shown in FIG. 10, in this seventh embodiment the drains of the N-channel MONOS semiconductor device 1 and the P-channel MONOS semiconductor device 9 are connected together at the connection point 3, the gates of both MONOS semiconductor devices 1 and 9 are connected to ground (GND) to be maintained at ground potential during detection operation and both gates are applied with positive voltage (Vpp) at initialization. Since the P-channel MONOS semiconductor device 9 is therefore put into depressed operation, it functions as a resistance element like the resistor 2 of the first embodiment.

When the radiation dosimeter is exposed to radiation, the absolute value of threshold voltage of the N-channel MONOS semiconductor device 1 falls with increasing radiation dose, while the absolute value of threshold voltage of the P-channel MONOS semiconductor device 9 rises. When the radiation dose reaches a preset value, the detection signal changes from the level of the source voltage Vcc to ground level. From this it can be ascertained that the dose has reached the preset value.

The dose is preset by selecting the rewrite voltage (Vpp) of the P-channel MONOS semiconductor device 9 or its channel width or length.

Since the seventh embodiment can readily effect self-restoration to the initial state by applying positive voltage to the gates to erase the positive charge built up in the gate oxide films of the MONOS semiconductor devices 1 and 9 by radiation exposure, it can effect dose measurement any number of times accurately without need for annealing.

Figure 11:
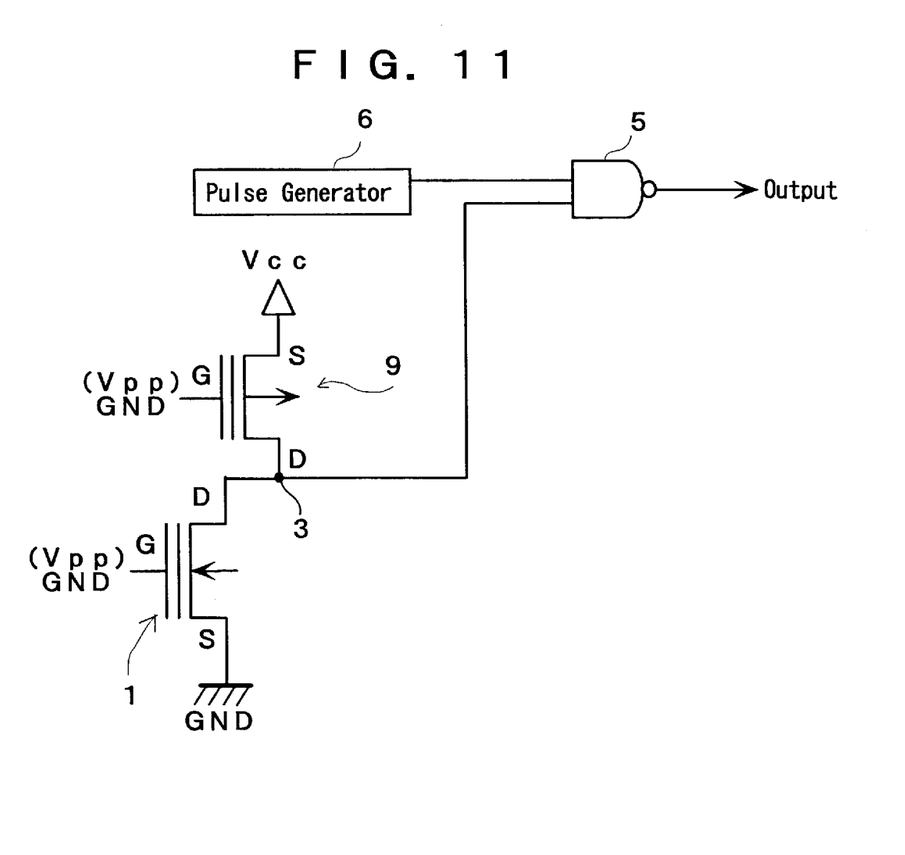

Eighth Embodiment: FIG. 11

The eighth embodiment shown in FIG. 11 is what is obtained by adding a pulse generator 6 and a NAND circuit 5 to the circuit of the seventh embodiment shown in FIG. 10, and in this respect is similar to the second embodiment shown in FIG. 5. The detection signal from the connection point 3 between drains of the N-channel MONOS semiconductor device 1 and the P-channel MONOS semiconductor device 9 and the pulse signal produced by the pulse generator 6 are input to the NAND circuit 5. The detection output is obtained from the output terminal of the NAND circuit 5.

Like the seventh embodiment shown in FIG. 10, this eighth embodiment can also detect that the radiation dose has reached the preset value from the termination of pulse signal output from the NAND circuit 5.

Like the seventh embodiment it can also effect self-restoration of the gate oxide films of the MONOS semiconductor devices 1 and 9 to the initial state and can therefore can similarly effect dose measurement any number of times accurately without need for annealing.

Figure 12:
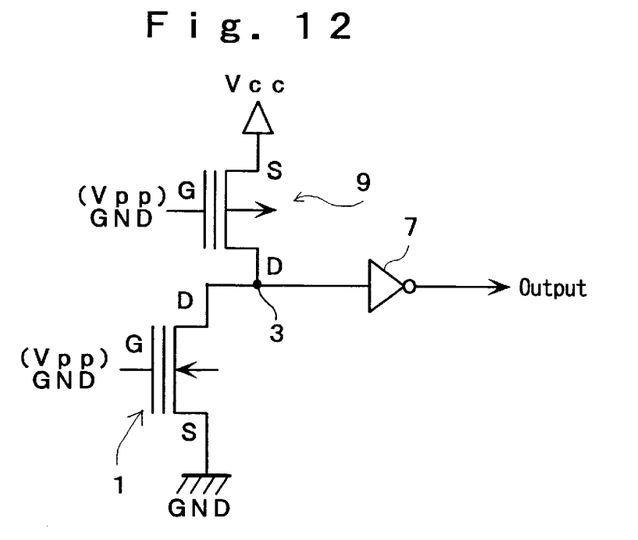

Ninth embodiment: FIG. 12

The ninth embodiment shown in FIG. 12 is what is obtained by adding an inverter 7 to the circuit of the seventh embodiment shown in FIG. 10, and in this respect is similar to the third embodiment shown in FIG. 6. The inverter 7 inverts and outputs the detection signal from the connection point 3 between the drains of the N-channel MONOS semiconductor device 1 and the P-channel MONOS semiconductor device 9.

Like the third embodiment shown in FIG. 6, the ninth embodiment can also detect that the radiation dose has reached the set value from the change of the output of the inverter 7 from low level to high level.

Moreover, like the eighth embodiment, the ninth embodiment can also effect self-restoration of the gate oxide films of the MONOS semiconductor devices 1 and 9 to the initial state and can therefore can similarly effect dose measurement any number of times accurately without need for annealing.

Figure 13:
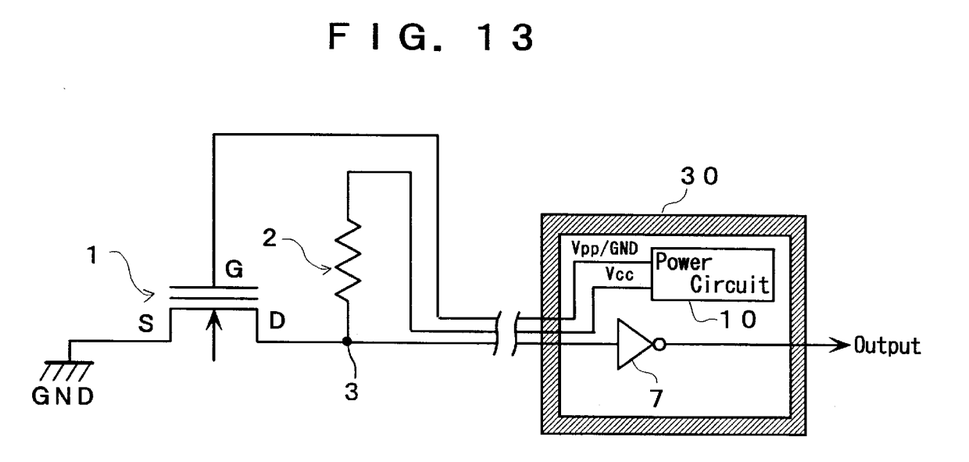
Figure 14:
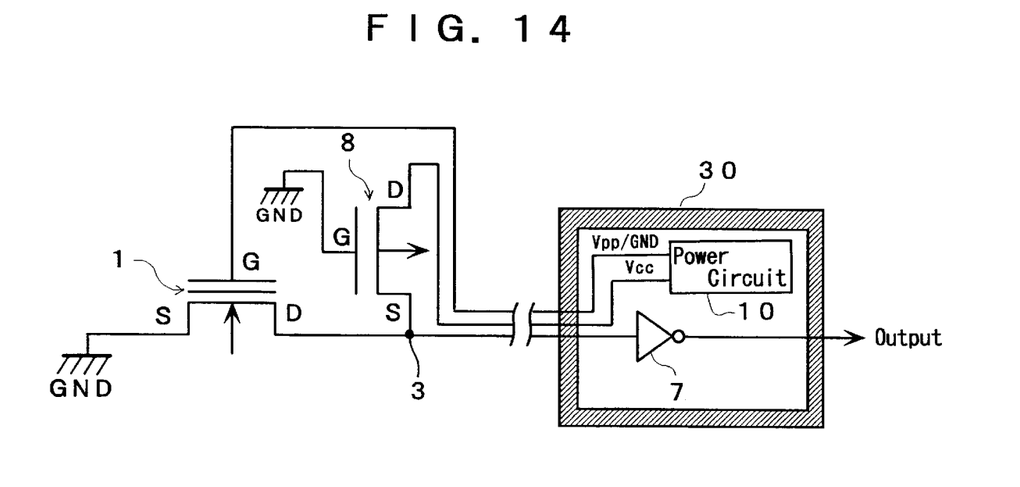
Figure 15:
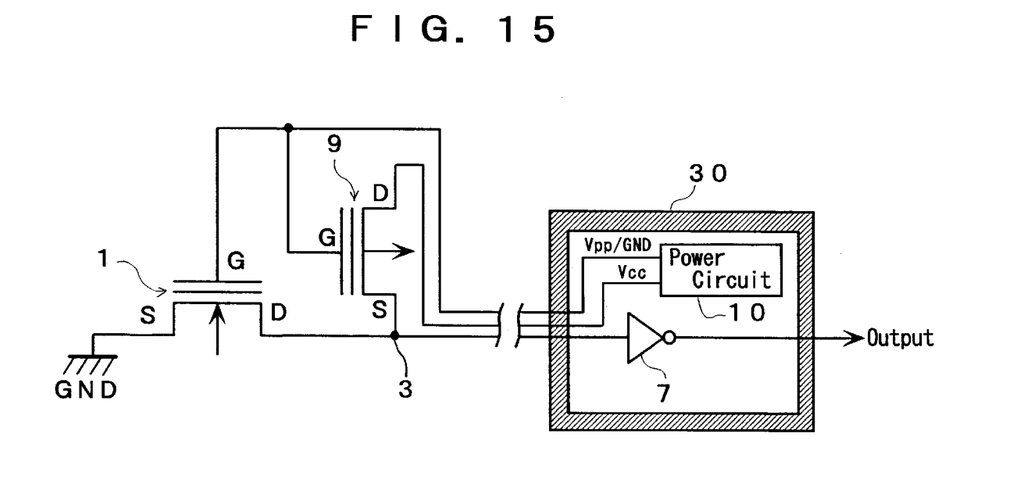

Tenth, Eleventh and Twelfth Embodiments: FIGS. 13, 14 and 15.

There will now be explained embodiments which are equipped with a control circuit including a power circuit for supplying the source voltage Vcc in the foregoing embodiments, a circuit for effecting rewrite of the MONOS semiconductor device, and a circuit for detecting change in the detection signal, and are further provided with a shielding wall for shielding the control circuit from radiation.

The tenth embodiment shown in FIG. 13 has a radiation dosimeter configured in the manner of the third embodiment shown in FIG. 6. It is additionally provided with a control circuit which includes a power circuit 10 and an inverter 7 and is enclosed by a shielding wall 30 made of lead or the like for shielding it from radiation. The power circuit 10 supplies the source voltage Vcc applied to one end of the resistor 2 and also serves as a circuit for normally keeping the gate of the N-channel MONOS semiconductor device 1 at ground potential and applying positive pulse current thereto only when rewrite for initialization is effected. The inverter 7 is a circuit for detecting change in the detection signal from the connection point 3.

The dose detection method of the tenth embodiment is the same as that of the third embodiment shown in FIG. 6. It provides enhanced detection accuracy, however, since only the components for detecting radiation dose, i.e., the N-channel MONOS semiconductor device 1 and the resistor 2 made of polycrystalline silicon which is little affected by exposure to radiation, are present in the radiation environment, while the control circuit including the power circuit 10 and the inverter 7 is not affected by the radiation.

The eleventh embodiment shown in FIG. 14 has a radiation dosimeter configured in the manner of the sixth embodiment shown in FIG. 9. Like the tenth embodiment, it is additionally provided with a control circuit which includes a power circuit 10 and an inverter 7 and is enclosed by a shielding wall 30 made of lead or the like. The power circuit 10 also serves as a circuit for effecting rewrite of the N-channel MONOS semiconductor device 1. The inverter 7 is a circuit for detecting change in the detection signal from the connection point 3.

The dose detection method of the eleventh embodiment is the same as that of the sixth embodiment shown in FIG. 9. It provides enhanced detection accuracy, however, since only the components for detecting radiation dose, i.e., the N-channel MONOS semiconductor device 1 and the P-channel MOS semiconductor device 8, are present in the radiation environment, while the control circuit including the power circuit 10 and the inverter 7 is not affected by the radiation.

The twelfth embodiment shown in FIG. 15 has a radiation dosimeter configured in the manner of the ninth embodiment shown in FIG. 12. Like the tenth and eleventh embodiments, it is additionally provided with a control circuit which includes a power circuit 10 and an inverter 7 and is enclosed by a shielding wall 30 made of lead or the like. The power circuit 10 also serves as a circuit for effecting rewrite of the N-channel MONOS semiconductor device 1. The inverter 7 is a circuit for detecting change in the detection signal from the connection point 3.

The dose detection method of the twelfth embodiment is the same as that of the ninth embodiment shown in FIG. 12. It provides enhanced detection accuracy, however, since only the components for detecting radiation dose, i.e., the N-channel MONOS semiconductor device 1 and the P-channel MONOS semiconductor device 9, are present in the radiation environment, while the control circuit including the power circuit 10 and the inverter 7 is not affected by the radiation.

As the circuit for detecting change in the detection signal incorporated in the control circuit and enclosed by the shielding wall 30, there can be used the pulse generator 6 and NAND circuit 5 employed in the second, fifth and eighth embodiments shown in FIGS. 5, 8 and 11.

The radiation dosimeters of these embodiments are particularly effective when used in an environment that permits wires to be led to the exterior of the nuclear reactor or the like.

Figure 16:
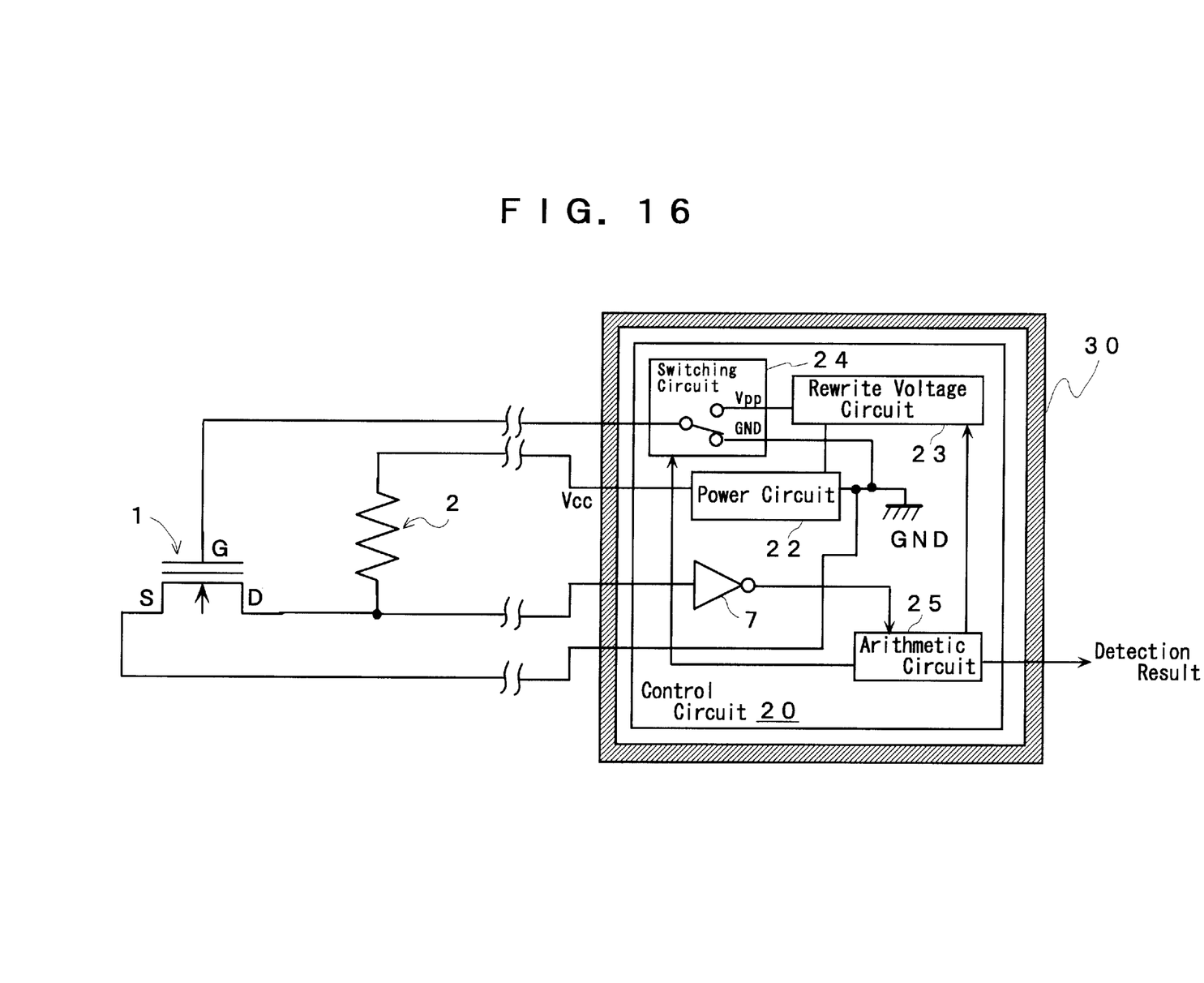
Figure 17:
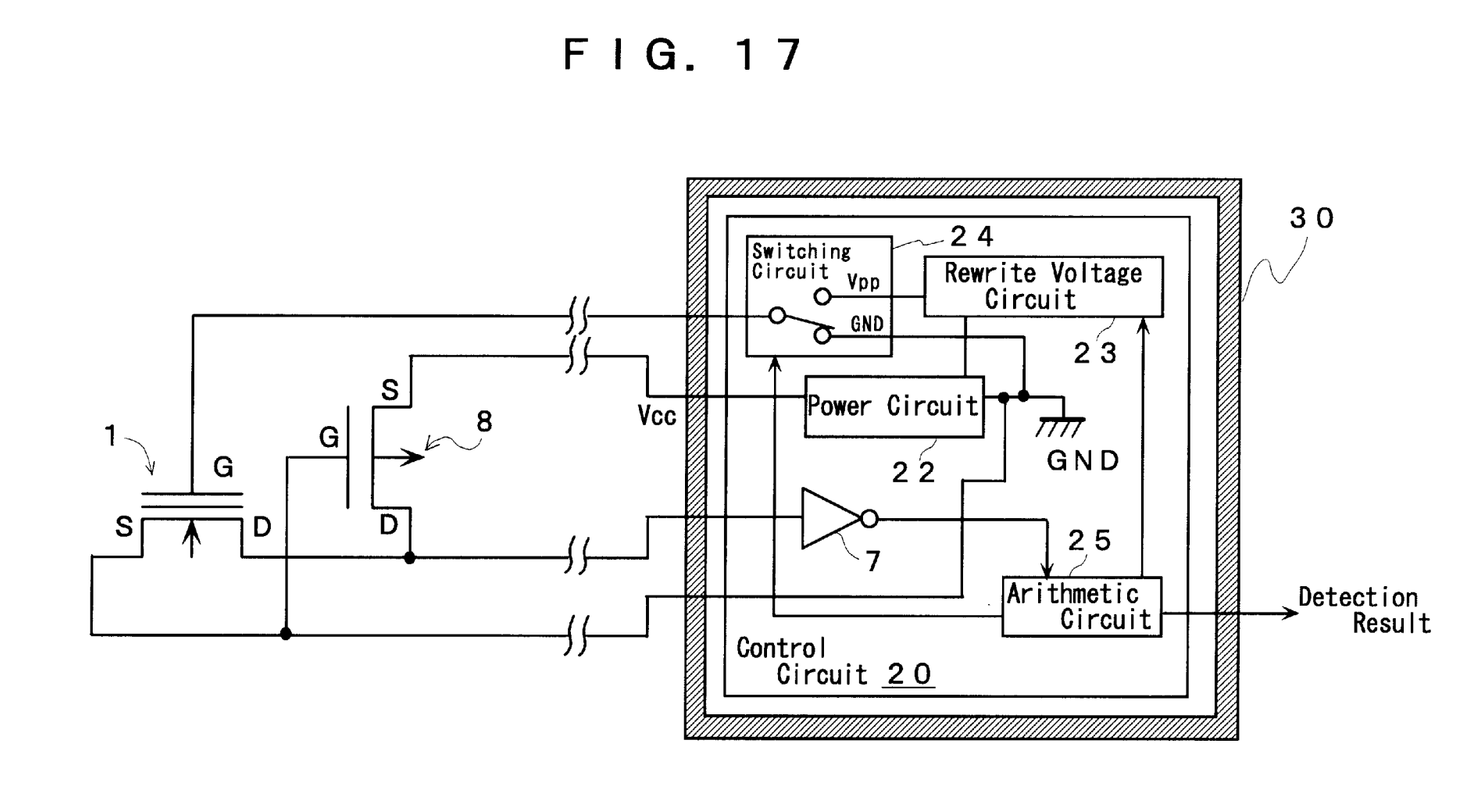
Figure 18:
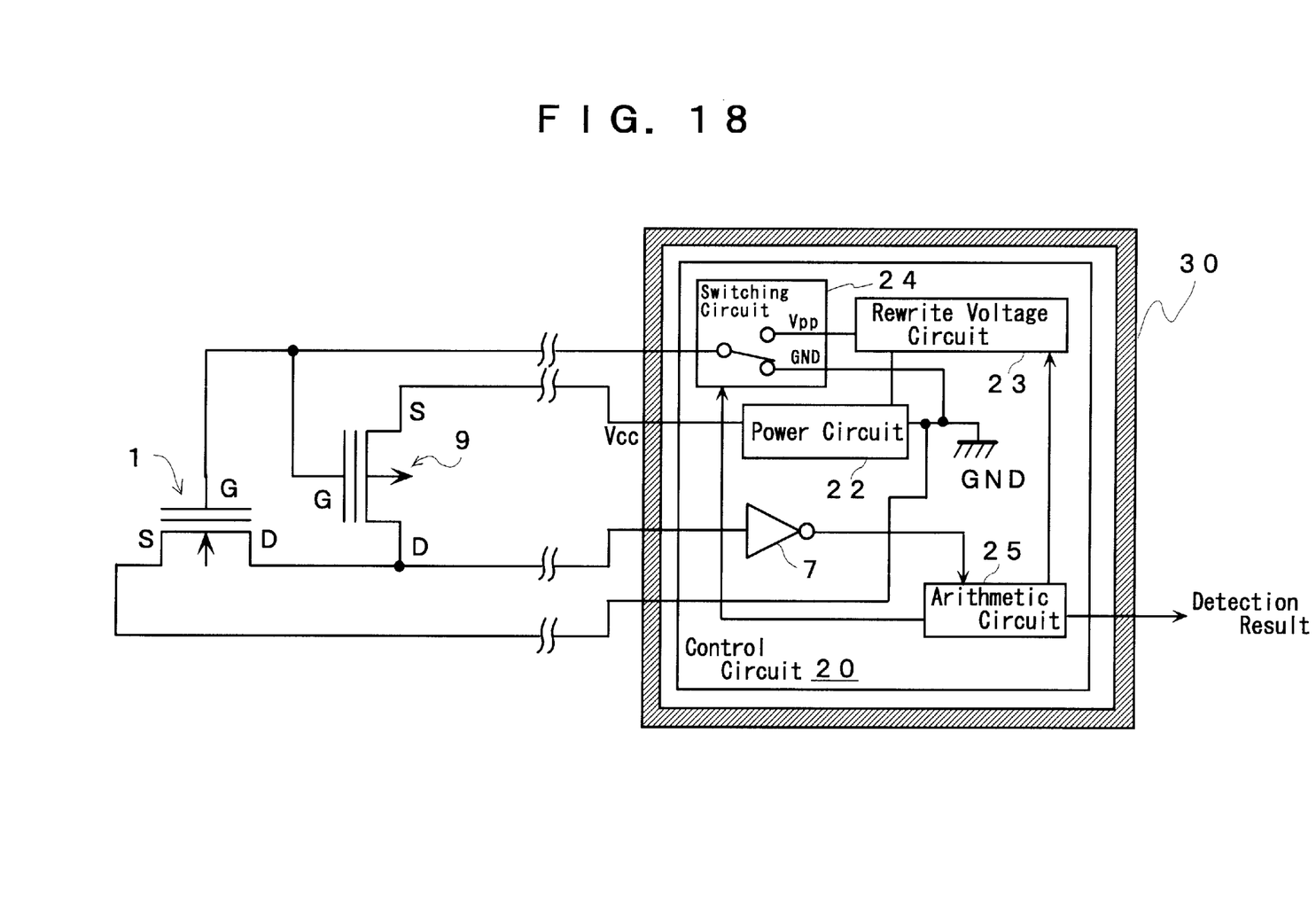

Thirteenth, Fourteenth and Fifteenth Embodiments: FIGS. 16, 17 and 18

Thirteenth, fourteenth and fifteenth embodiments in which the configuration of the control circuit of the aforesaid tenth, eleventh and twelfth embodiments is more explicitly defined will now be explained.

FIGS. 16, 17 and 18 are circuit diagrams respectively showing the thirteenth, fourteenth and fifteenth embodiments of the radiation dosimeter according to the invention. The thirteenth, fourteenth and fifteenth embodiments are respectively similar to the tenth, eleventh and twelfth embodiments shown in FIGS. 13, 14 and 15 and differ therefrom only in the configuration of the control circuit 20 provided as enclosed within the shielding wall 30.

The control circuit 20 comprises a power circuit 22 for supplying the source voltage Vcc, a ground (GND), a rewrite voltage generator 23 which receives voltage from the power circuit 22 and generates the rewrite voltage Vpp for initializing the N-channel MONOS semiconductor device 1, a switching circuit 24 which normally connects the gate of the N-channel MONOS semiconductor device 1 to ground (GND) to maintain it at ground potential and switches it into connection with the rewrite voltage Vpp from the rewrite voltage generator 23 at initialization, the inverter 7 for detecting change in the detection signal, and an arithmetic circuit 25.

When the arithmetic circuit 25 determines based on the output of the inverter 7 that the radiation dose has reached the set value, it triggers the rewrite voltage generator 23 to produce a pulse of the rewrite voltage Vpp of prescribed pulse width and switches the switching circuit 24 to apply the rewrite voltage Vpp to the gate of the N-channel MONOS semiconductor device 1. It further counts the number of rewrites effected, calculates the total radiation dose from the number of rewrites, and outputs the calculated value to the exterior as the detection result.

In the fifteenth embodiment of FIG. 18, initialization is effected at the time the radiation dose reaches the set value by applying the rewrite voltage Vpp produced by the rewrite voltage generator 23 to the gates of the two MONOS semiconductor devices 1 and 9.

These embodiments can also achieve high detection accuracy since their control circuits 20 are enclosed by the shielding wall 30 and therefore unaffected by radiation.

The set value of the radiation dose to be detected and the detection accuracy can be varied by varying the level of the source voltage Vcc produced by the power circuit 22. Since the arithmetic circuit 25 counts the number of rewrites, namely, the number of times the radiation dose reaches the set value, and calculates and outputs the total radiation dose, information regarding the total radiation dose can be secured over a long period.

As the circuit for detecting change in the detection signal incorporated in the control circuit 20 and enclosed by the shielding wall 30 in these embodiments, there can be used the pulse generator 6 and NAND circuit 5 employed in the second, fifth and eighth embodiments shown in FIGS. 5, 8 and 11.

The radiation dosimeters of these embodiments are particularly effective when used in an environment that permits wires to be led to the exterior of the nuclear reactor or the like.

Other Embodiments

Although the embodiments of the invention explained in the foregoing use an N-channel MONOS semiconductor device as a non-volatile memory cell, it is possible to use a P-channel MONOS semiconductor device instead. In this case, however, the polarity of the voltage applied to the source and drain of the MONOS semiconductor device is reversed from that in the foregoing embodiments, i.e., positive voltage is applied to the source and the drain is connected to ground (GND).

When an MONOS semiconductor device and an MOS semiconductor device are used in series connection or when an MONOS semiconductor device and an MONOS semiconductor device are used in series connection, the connected semiconductor devices must have channels of opposite conductivity type. However, it suffices for either to be of N-channel type and the other to be of P-channel type.

In the seventh embodiment, the drains of an N-channel MONOS semiconductor device and a P-channel MONOS semiconductor device are connected together, the gates of the MONOS semiconductor devices are both connected to ground during detection operation and both gates are applied with positive voltage at initialization. Alternatively, however, it is possible to effect initialization by applying positive voltage to the gate of the N-channel MONOS semiconductor device to inject electrons into the gate insulating film thereof and applying negative voltage to the gate of the P-channel MONOS semiconductor device to inject holes into the gate insulating film thereof, and to conduct detection operation with the gate of N-channel MONOS semiconductor device connected to ground to maintain it at ground potential and the gate of the P-channel MONOS semiconductor device connected to the positive source voltage.

Although a resistor formed of polycrystalline silicon which is little affected by exposure to radiation is used as the resistor 2 in the foregoing embodiments, the resistor 2 can instead be a pinch-off resistor which is formed in a semiconductor substrate little affected by exposure to radiation and whose effect on the charge in the oxide film is suppressed.

What is claimed is:

1. A radiation dosimeter comprising an MONOS semiconductor and a resistor connected in series between a source voltage and ground (GND), said MONOS semiconductor device being an electrically rewritable non-volatile memory cell having a gate insulating film consisting of a tunnel oxide film, a silicon nitride film and a top oxide film, and a detection signal being obtainable from a connection point between the MONOS semiconductor device and the resistor.

2. A radiation dosimeter according to claim 1, wherein the resistor is constituted of polycrystalline silicon whose resistance value is little changed by exposure to radiation.

3. A radiation dosimeter according to claim 1, further comprising a pulse generator and a NAND circuit, the NAND circuit receiving a pulse signal generated by the pulse generator and the detection signal as input and outputting a detection signal from an output terminal thereof.

4. A radiation dosimeter according to claim 1, further comprising an inverter which inverts and outputs the detection signal.

5. A radiation dosimeter according to claim 1, further comprising:

a control circuit including a power circuit for supplying the source voltage, a circuit for effecting rewrite of the MONOS semiconductor device and a circuit for detecting change in the detection signal, and a shielding wall for shielding the control circuit from radiation.

6. A radiation dosimeter according to claim 5, wherein the control circuit further comprises an arithmetic circuit which calculates radiation dose from the detection signal, causes the circuit for effecting rewrite of the MONOS semiconductor device to effect rewrite of the MONOS semiconductor device when the calculated dose reaches a preset value and calculates total radiation dose from the number of rewrites.

7. A radiation dosimeter comprising an MONOS semiconductor and an MOS semiconductor device whose channel conductivity type is opposite from that of the MONOS semiconductor device connected in series between a source voltage and ground (GND), said MONOS semiconductor device being an electrically rewritable non-volatile memory cell having a gate insulating film consisting of a tunnel oxide film, a silicon nitride film and a top oxide film, and a detection signal being obtainable from a connection point between the MONOS semiconductor device and the MOS semiconductor device.

8. A radiation dosimeter according to claim 7, further comprising a pulse generator and a NAND circuit, the NAND circuit receiving a pulse signal generated by the pulse generator and the detection signal as input and outputting a detection signal from an output terminal thereof.

9. A radiation dosimeter according to claim 7, further comprising an inverter which inverts and outputs the detection signal.

10. A radiation dosimeter according to claim 7, further comprising:
    a control circuit including a power circuit for supplying the source voltage, a circuit for effecting rewrite of the MONOS semiconductor device and a circuit for detecting change in the detection signal, and
    a shielding wall for shielding the control circuit from radiation.

11. A radiation dosimeter according to claim 10, wherein the control circuit further comprises an arithmetic circuit which calculates radiation dose from the detection signal, causes the circuit for effecting rewrite of the MONOS semiconductor device to effect rewrite of the MONOS semiconductor device when the calculated dose reaches a preset value and calculates total radiation dose from the number of rewrites.

12. A radiation dosimeter comprising a first MONOS semiconductor and a second MONOS semiconductor device whose channel conductivity type is opposite from that of the first MONOS semiconductor device connected in series between a source voltage and ground (GND), the MONOS semiconductor devices being electrically rewritable non-volatile memory cells each having a gate insulating film consisting of a tunnel oxide film, a silicon nitride film and a top oxide film, and a detection signal being obtainable from a connection point between the first and second MONOS semiconductor devices.

13. A radiation dosimeter according to claim 12, further comprising a pulse generator and a NAND circuit, the NAND circuit receiving a pulse signal generated by the pulse generator and the detection signal as input and outputting a detection signal from an output terminal thereof.

14. A radiation dosimeter according to claim 12, further comprising an inverter which inverts and outputs the detection signal.

15. A radiation dosimeter according to claim 12, further comprising:
    a control circuit including a power circuit for supplying the source voltage, a circuit for effecting rewrite of the MONOS semiconductor devices and a circuit for detecting change in the detection signal, and
    a shielding wall for shielding the control circuit from radiation.

16. A radiation dosimeter according to claim 15, wherein the control circuit further comprises an arithmetic circuit which calculates radiation dose from the detection signal, causes the circuit for effecting rewrite of the MONOS semiconductor devices to effect rewrite of the MONOS semiconductor devices when the calculated dose reaches a preset value and calculates total radiation dose from the number of rewrites.

* * * * *